(12) United States Patent
Davidson

(10) Patent No.: US 10,131,326 B2
(45) Date of Patent: Nov. 20, 2018

(54) TIRE MOUNTING AND INFLATION APPARATUS AND METHOD

(71) Applicant: Ken Davidson, Lakeville, MN (US)

(72) Inventor: Ken Davidson, Lakeville, MN (US)

(*) Notice: Subject to any disclaimer, the term of this patent is extended or adjusted under 35 U.S.C. 154(b) by 455 days.

(21) Appl. No.: 14/865,620

(22) Filed: Sep. 25, 2015

(65) Prior Publication Data
US 2017/0088102 A1 Mar. 30, 2017

(51) Int. Cl.
*B60S 5/04* (2006.01)
*B60C 25/14* (2006.01)

(52) U.S. Cl.
CPC .............. *B60S 5/04* (2013.01); *B60C 25/145* (2013.01); *Y10T 137/0441* (2015.04); *Y10T 137/0491* (2015.04); *Y10T 137/3584* (2015.04); *Y10T 137/6109* (2015.04)

(58) Field of Classification Search
CPC .. Y10T 137/0441; Y10T 137/3584–137/3786; Y10T 137/6109; Y10T 137/6113; Y10T 137/6918; Y10T 137/6855; Y10T 137/0491; B60S 5/04; B60C 25/145
USPC ........ 137/223–234.5, 315.41, 315.42, 15.08, 137/355.16, 899, 15.18; 152/415, 427, 152/431, DIG. 8, DIG. 13; 29/894.37, 29/894.31, 894.43, 221.5; 81/15.2, 15.4; 141/1, 38; 157/1.1
See application file for complete search history.

(56) References Cited

U.S. PATENT DOCUMENTS

| | | | |
|---|---|---|---|
| 3,675,705 A * | 7/1972 | Corless | ................. B60C 25/132 157/1.1 |
| 3,851,695 A | 12/1974 | Kimberly | |
| 3,937,264 A | 2/1976 | Mikovits et al. | |
| 4,263,958 A | 4/1981 | Corless | |
| 4,528,735 A * | 7/1985 | Eastridge | ................ B60C 25/18 29/221.5 |
| 4,744,402 A | 5/1988 | St.-Hllaire | |
| 4,850,402 A | 7/1989 | Cunningham et al. | |
| 4,947,919 A | 8/1990 | Timlin | |
| 5,168,911 A | 12/1992 | Gottschalk | |
| 5,170,828 A | 12/1992 | Curcuri | |
| 5,509,456 A | 4/1996 | Bonko et al. | |
| 5,803,108 A * | 9/1998 | Schuessler, Jr. | ...... B60C 29/062 137/15.08 |
| 5,878,801 A | 3/1999 | Ellis | |
| 6,286,578 B1 | 9/2001 | Schmitt | |
| 6,561,233 B2 | 5/2003 | Weems et al. | |
| 6,648,027 B1 * | 11/2003 | Didur | .................... B60C 29/064 141/38 |
| 6,698,482 B2 | 3/2004 | Hennig et al. | |
| 7,017,642 B2 | 3/2006 | Brahler, II | |

(Continued)

*Primary Examiner* — Craig J Price
(74) *Attorney, Agent, or Firm* — Haugen Law Firm PLLP

(57) ABSTRACT

An apparatus and method for mounting and inflating tires is described that is suitable for quickly sealing the beads of a tire to the rim of a wheel. The present invention delivers a high volume of pressurized air to an interior of a tire through a nozzle. The apparatus of the invention is particularly well suited for tire changing machines and tire mounting subsystems. The apparatus includes a tire changing station, an air supply controller, and a nozzle capable of delivering a high volume of pressurized fluid into an interior of a tire through a valve stem hole of the wheel rim.

20 Claims, 14 Drawing Sheets

(56) References Cited

U.S. PATENT DOCUMENTS

| | | | |
|---|---|---|---|
| 7,284,327 B1 * | 10/2007 | Varnum | B60C 29/06 152/431 |
| 7,373,963 B2 | 5/2008 | Strickland, Jr. | |
| 7,404,427 B2 | 7/2008 | Hillman et al. | |
| 7,454,965 B2 | 11/2008 | Blossfeld et al. | |
| 7,882,882 B2 | 2/2011 | Cunningham | |
| 8,186,373 B2 | 5/2012 | Huang et al. | |
| 8,307,869 B2 | 11/2012 | Medley et al. | |
| 8,327,897 B2 | 12/2012 | Firestone | |
| 8,448,686 B2 | 5/2013 | Rudebeck | |
| 8,522,437 B2 | 9/2013 | Lawson et al. | |
| 8,720,475 B2 | 5/2014 | Wu | |
| 8,733,419 B2 | 5/2014 | White | |
| 8,749,367 B2 | 6/2014 | Schofield et al. | |
| 8,752,604 B2 | 6/2014 | Kunau | |
| 2009/0188570 A1 | 7/2009 | Lin | |
| 2014/0116629 A1 | 5/2014 | Story | |
| 2014/0305538 A1 | 10/2014 | Story | |

* cited by examiner

TIRE MOUNTING AND INFLATION APPARATUS AND METHOD

CROSS-REFERENCE TO RELATED APPLICATIONS

Not Applicable.

FEDERAL SPONSORSHIP

Not Applicable

JOINT RESEARCH AGREEMENT

Not Applicable

TECHNICAL FIELD

This invention pertains generally to tubeless tire rim mount and changing devices. More particularly, the invention pertains to an air pressure hose nozzle usable with a tire mounting system that provides for efficient bead seating and rapid inflation of a tubeless tire onto a wheel rim. The tire mount and inflation apparatus is particularly well suited for mounting and rapidly inflating tires having an internal pressure sensor coupled to the air valve stem.

BACKGROUND

Over the years, various tire mounting and tire changing systems have been devised to safely remove and mount a tire to a wheel rim. When mounting a tubeless tire to a rim the tire bead on both sides of the tire must seat and seal to the wheel rim in order to retain a desired tire pressure of the tire mounted on the wheel rim. The size and type of may require more outward force to properly seat both beads against the wheel rim. It has been found that rapidly delivering high volumes of pressurized air into an interior of the tire tends to apply on outwardly acting force against the interior of the tire sidewalls and causes the tire beads to quickly snap in place and seal to the wheel rim. Prior devices include limitations that do not allow for the rapid delivery of high volumes of air to the interior of a tire to seat the beads to the wheel rim. For example, prior attempts have been made to supply high volumes of air between the tire bead and wheel rim, however, as the tire bead moves toward the wheel rim the tire tends to block the stream of air into the tire interior and reduces the effectiveness of the internal pressure forces against the tire walls. Tires with stiff sidewalls or other characteristics may prove difficult to seat the beads to the wheel rim when air is supplied between the rim and tire bead. Other attempts have been made to rapidly deliver pressurized air through the valve stem or the valve stem hole in the wheel rim. However, the valve in the valve stem limits the rate and amount of air that may be delivered through the valve stem.

Further, although removal of the valve from the valve stem or removal of the valve stem from the hole in the wheel rim allows for a more rapid or higher volume delivery of air to the interior of the tire, the replacement of the valve stem or replacement of the valve within the valve stem, without loss of significant air pressure and disruption of the bead seal, has proven to be problematic. Also, when a sensor is attached to the valve body, prior systems have required engaging the valve stem body to the valve stem hole formed in the wheel rim prior to delivering air pressure to an interior of the tire. The shortcomings of prior tire changing systems and automated tire assembly systems also increases the amount of time taken to mount and inflate a tire on a wheel rim to a desired internal pressure.

SUMMARY

Embodiments according to aspects of the invention expeditiously deliver a high volume of pressurized air to the interior of a tubeless tire when mounting a tire to a wheel rim. Embodiments of the compressed air delivery apparatus of the present invention includes a nozzle and a cable extending through at least a portion of the nozzle. The nozzle has a main body and an air delivery conduit extending from main body. The main body and air delivery conduit form an air passage that is sufficiently large to allow rapid flow of high volumes of pressurized air through the passageway. The main body also has a coupling attachable thereto that is adapted to couple to a pressurized air supply conduit. A portion of the cable extends from an open end of the air delivery conduit. The free end of the cable includes a threaded adapter coupled to the end of the cable. The adapter has an outer diameter smaller than a valve stem hole in the wheel rim. The threaded adapter also has an internal threaded hole that is suitable to screw onto the end of a tire valve stem. In an embodiment of the invention a portion of the cable extends through at least a portion of the air delivery conduit and an end opposing the adapter is secured to the nozzle main body.

In embodiments of the invention the main body of the nozzle may include a first passageway in fluid communication with a high volume pressurized air supply and a second air passageway in fluid communication with an air return conduit. The nozzle may further include a first coupling to couple to the first passageway and high volume pressurized air stream delivery hose and a second coupling to couple to the second air passageway and air pressure feedback sensor. Additionally, a pressure feedback sensing switch may be coupled in fluid communication to the second air passageway or air return conduit. A pneumatic high volume air supply may be coupled to the pressurized air supply conduit and a flow valve may be coupled to the nozzle.

In an embodiment of the tire inflation air pressure hose nozzle of the present invention, the air delivery nozzle has a main body and an air delivery conduit extending from main body. The main body is adapted to couple to a pressurized air supply and the nozzle includes a cable having a threaded adapter attached to a first end of the cable. A portion of the cable extends through at least a portion of the air delivery conduit and the threaded adapter is further adapted to couple to a tire valve stem. Additionally, a pressure regulator may be coupled to the pressurized air supply and an internal tire pressure sensor may be coupled in fluid communication with the delivery nozzle. A pressure feedback sensing switch may be coupled in fluid communication with the pressurized air supply to control the internal air pressure within the tire while mounting the tire to the wheel rim. The air delivery nozzle may also include an air return conduit and an air pressure feedback sensor may be coupled in line to the air return conduit. Also, the pressure feedback sensing switch may be coupled in fluid communication with the air return conduit.

Expeditious delivery of a high volume of pressurized air to the interior of a tubeless tire when mounting a tire to a wheel rim may be accomplished in accordance with the present invention. The method of mounting and rapidly inflating a tire on a wheel rim, includes the steps of positioning a tire on a wheel rim, wherein inner and outer tire beads of the tire are positioned between respective inner and outer flanges of the wheel rim; positioning a valve stem within an interior of the tire adjacent an aperture formed in the wheel rim; providing a nozzle having a main body and an air delivery conduit extending from main body, the main body adapted to couple to a pressurized air supply conduit; providing a cable having a threaded adapter attached to a first end of the cable and wherein a portion of the cable extends through at least a portion of the air delivery conduit of the nozzle and wherein the threaded adapter is adaptable to couple to the valve stem; extending the adapter through the wheel rim hole and coupling the adapter to the valve stem within the interior of the tire; and delivering a high volume of fluid or air from the air delivery conduit of the nozzle into the interior of the tire through the aperture formed in the wheel rim. The rapid fill process may further include sealing the inner and outer tire beads against wheel rim and applying a force to the cable to move the valve stem through the aperture formed in the wheel rim.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
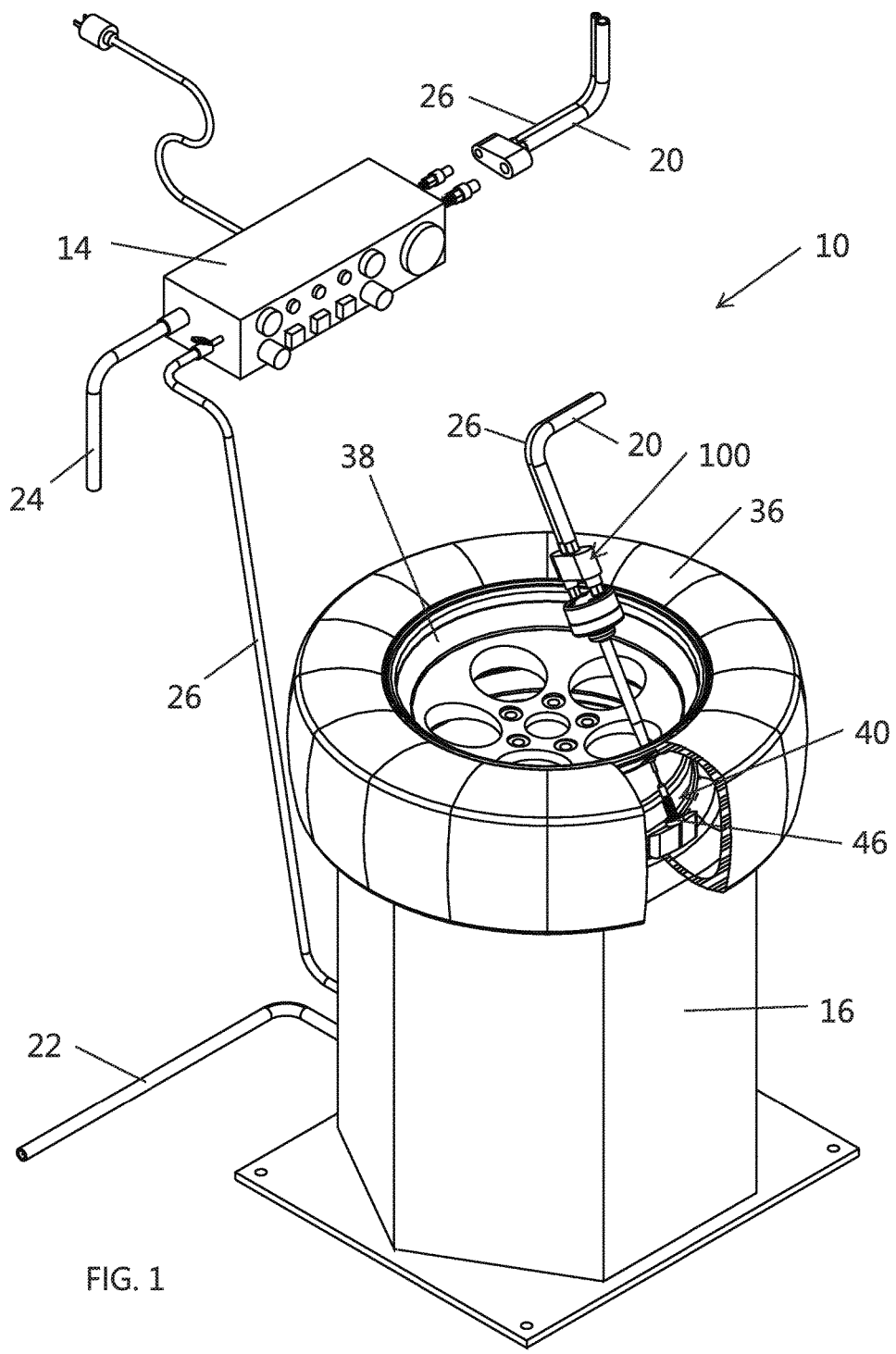
FIG. 1 is a partial sectional perspective view of an embodiment of a tire changing machine and high volume pressurized air nozzle apparatus of the present invention.

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The apparatus of the present invention is particularly well suited for automated tire changing and rapid inflation of the tire. The apparatus utilizes a volume of pressurized air having a pressure that is greater than a desired internal tire pressure to seat the tire bead against the wheel rim. The apparatus further includes monitoring of internal tire pressure so that once the tire bead seals against the wheel rim, the volume of air being delivered is controlled to avoid over inflation of the tire. The tire inflation system 10 of the present invention generally includes an air supply and air supply conduit 20, air supply controller 14, tire mounting station 16, and air delivery nozzle 100. Those skilled in the art will appreciate that the air delivery nozzle and the method of mounting a tire to a wheel rim in accordance with the present invention may also be utilized in automated tire changing stations as well as manual mounting of a tire to a rim (with or without an actual changing station).

With reference to FIGS. 1-6, embodiments according to aspects of the invention will be described in conjunction with the tire inflation system 10. The controller 14 includes a high volume air pressure gauge 28, internal tire pressure gauge 72, air pressure delivery adjustment 88, air volume and pressure bypass 30, indicator lamp 84, and other switches and controls (described in greater with reference to FIGS. 13 and 14). The controller 14 allows the user to set a desired pressure of fluid or air being delivered from a high volume air supply or air supply conduit 20 and to set the maximum desired air pressure within a tire 36 being mounted to a wheel rim 38. A controlled volume of pressurized air is delivered to the controller 14 through pressurized air conduit 24. Bypass switch 30 may be actuated to allow delivery of a higher volume of pressurized air to the interior of the tire. The bypass switch 30 may be used, for example, to seat the bead on difficult tires or when oversized or truck tires are being mounted. An air supply 22 may also be coupled to an air supply conduit incorporated into the tire mounting station 16. From the controller 14, the pressurized air flows through air supply conduit 20 to the nozzle 100 and out the high volume air delivery conduit 122 of the nozzle. A secondary or feedback conduit 126 of the nozzle is coupled to a pressure feedback conduit 26 that provides a passageway for air from the tire and allows monitoring of an internal pressure within the tire 36 as the tire bead seals against the wheel rim 38.

Figure 2:
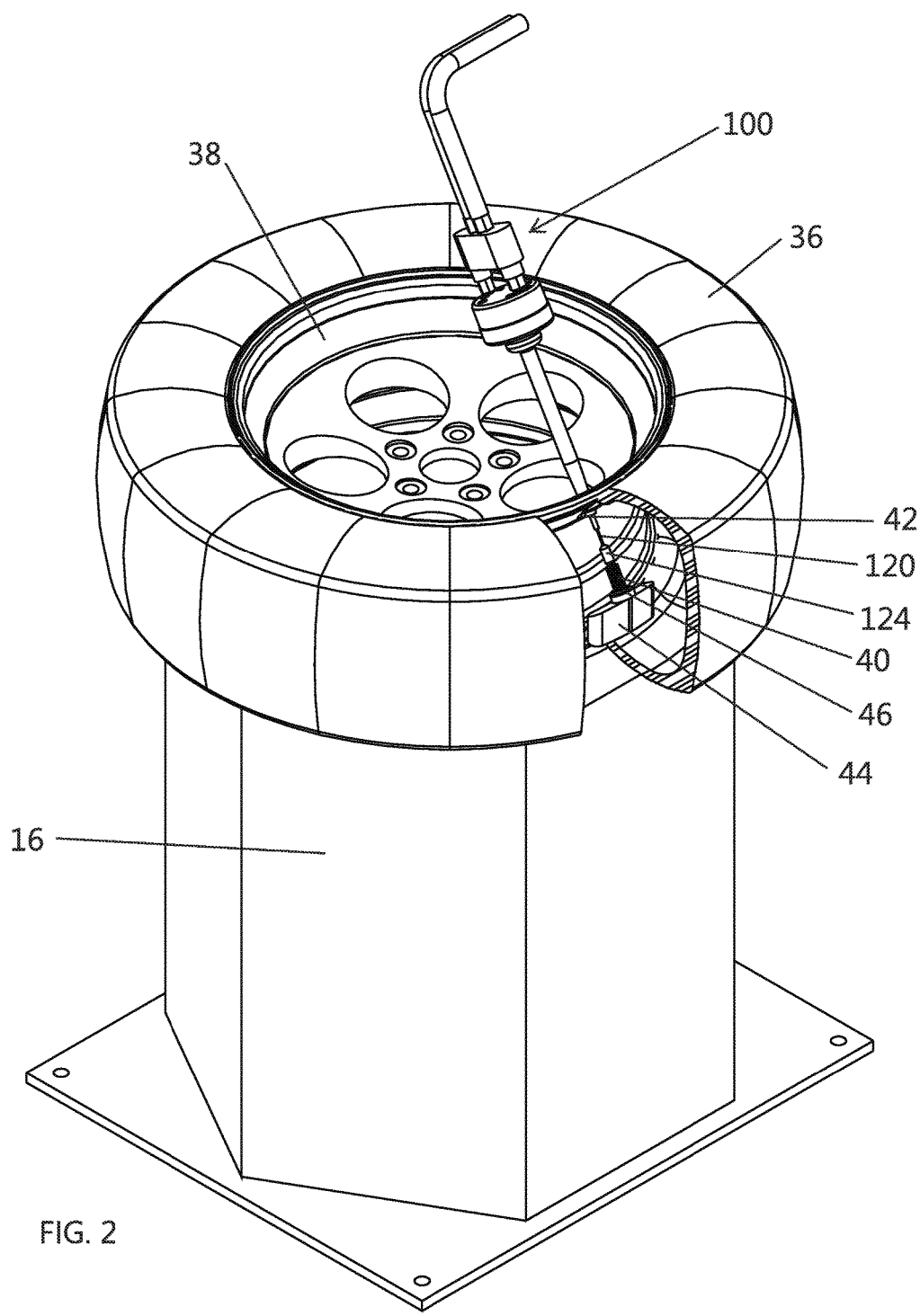
FIG. 2 is a partial sectional perspective view of an embodiment of a tire changing subsystem and high volume pressurized air nozzle apparatus of the present invention, showing a valve stem coupling coupled to a valve stem having a sensor attached to the stem.

FIGS. 1 and 2 illustrate a valve stem 40 coupled to a pressure sensor 44 of known suitable construction. The pressure sensor 44 may, for example, communicate with a vehicle's microprocessor to monitor the internal tire pressure once the tire is inflated and the valve stem 40 is sealed within the valve stem hole 42 of the wheel rim 38. The valve stem 40 of the type shown in FIG. 1 includes threading on the external surface of stem that receives a nut (not shown) to tighten and seal the valve stem body 46 against the wheel rim.

Those skilled in the art will appreciate that the diameter of the valve stem hole 42 and outer diameter of an open end of the nozzle air delivery conduit 122 may vary depending upon the diameter of the nozzle stem. For example, known rim hole diameters are available in 0.453 inches, 0.485 inches, 0.625 inches, and 0.8125 inches. A corresponding valve stem diameter is sized so that the valve stem may be inserted through the hole 42 and the valve body 46 snaps in place or otherwise seals to the rim 38.

Figure 3:
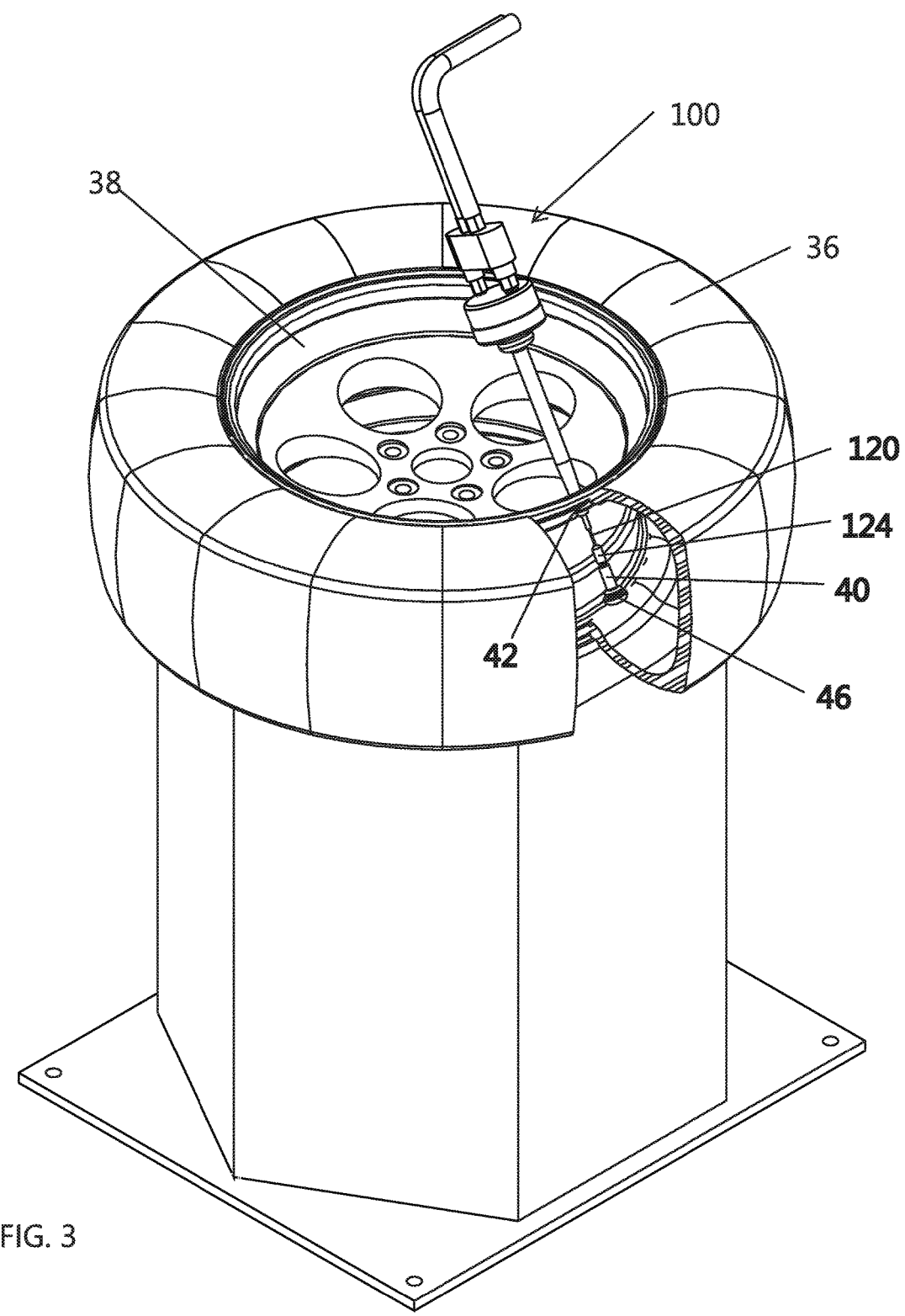
FIG. 3 is a partial sectional perspective view of an embodiment of a tire changing subsystem and high volume pressurized air nozzle apparatus of the present invention, showing a common snap in place valve stem.
Figure 4:
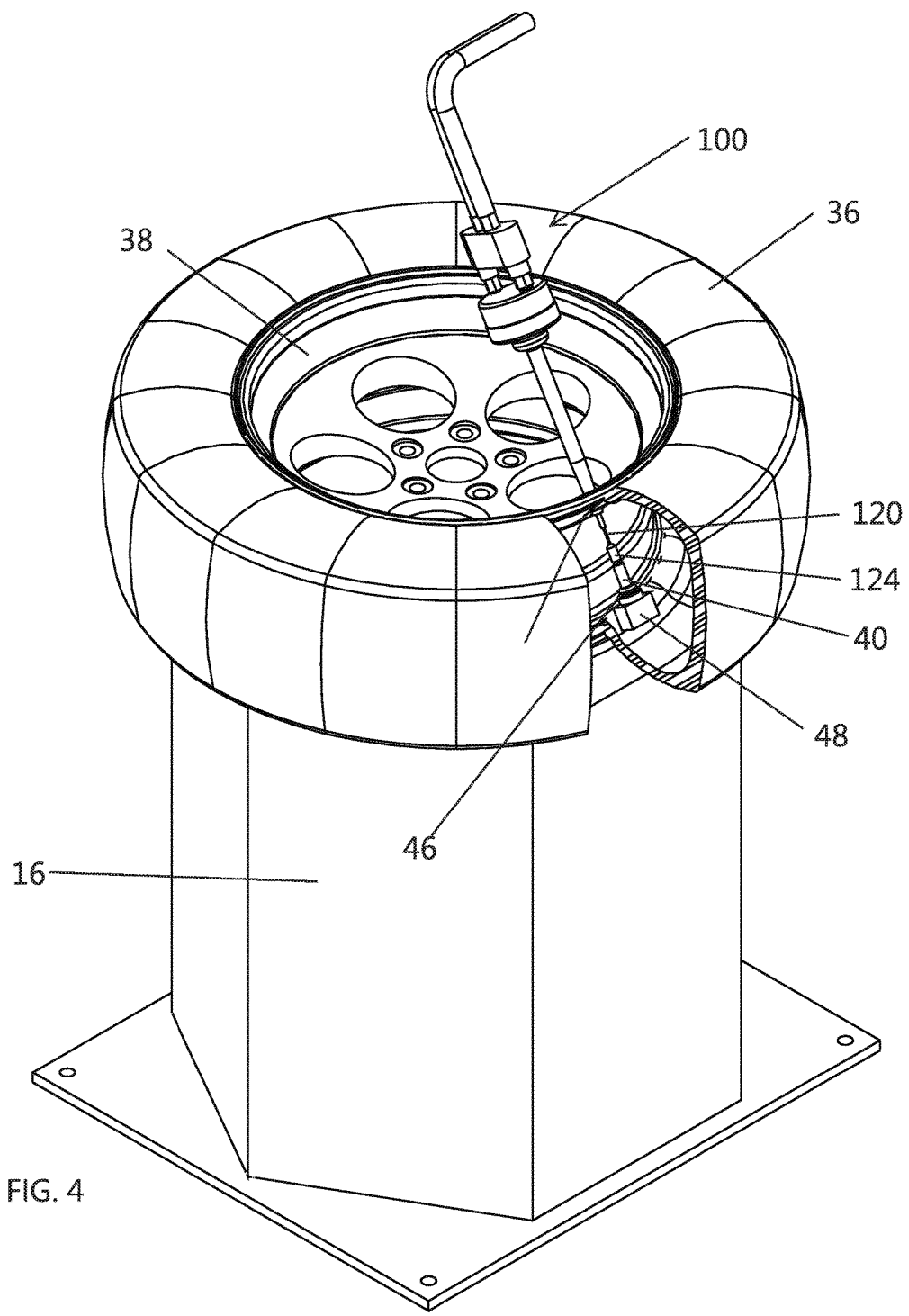
FIG. 4 is a partial sectional perspective view of an embodiment of a tire changing subsystem and high volume pressurized air nozzle apparatus of the present invention, showing a valve stem coupling coupled to a valve stem having a sensor attached to the stem.
Figure 5:
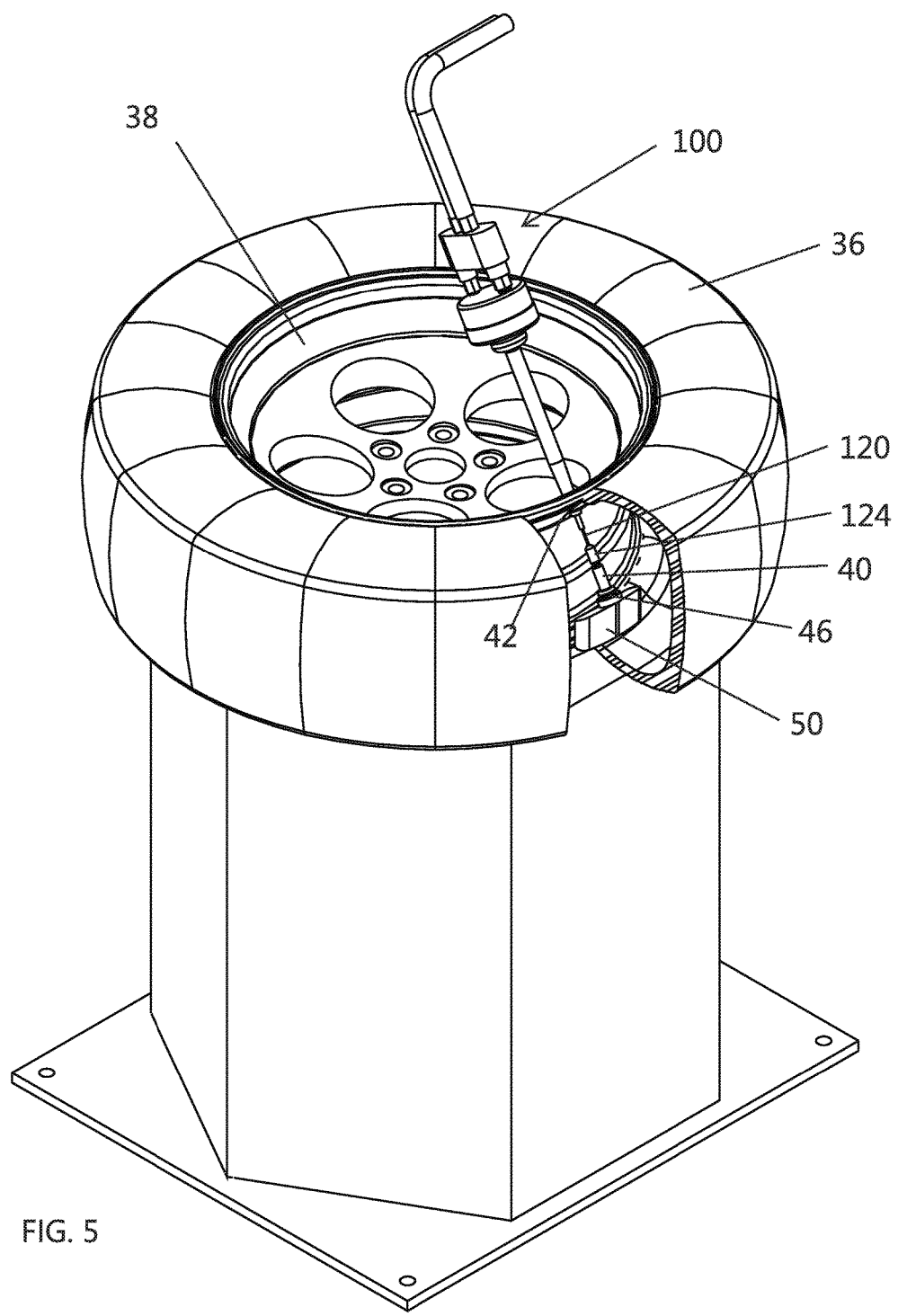
FIG. 5 is a partial sectional perspective view of an embodiment of a tire changing subsystem and high volume pressurized air nozzle apparatus of the present invention, showing a valve stem coupling coupled to a valve stem having a sensor attached to the stem.
Figure 6:
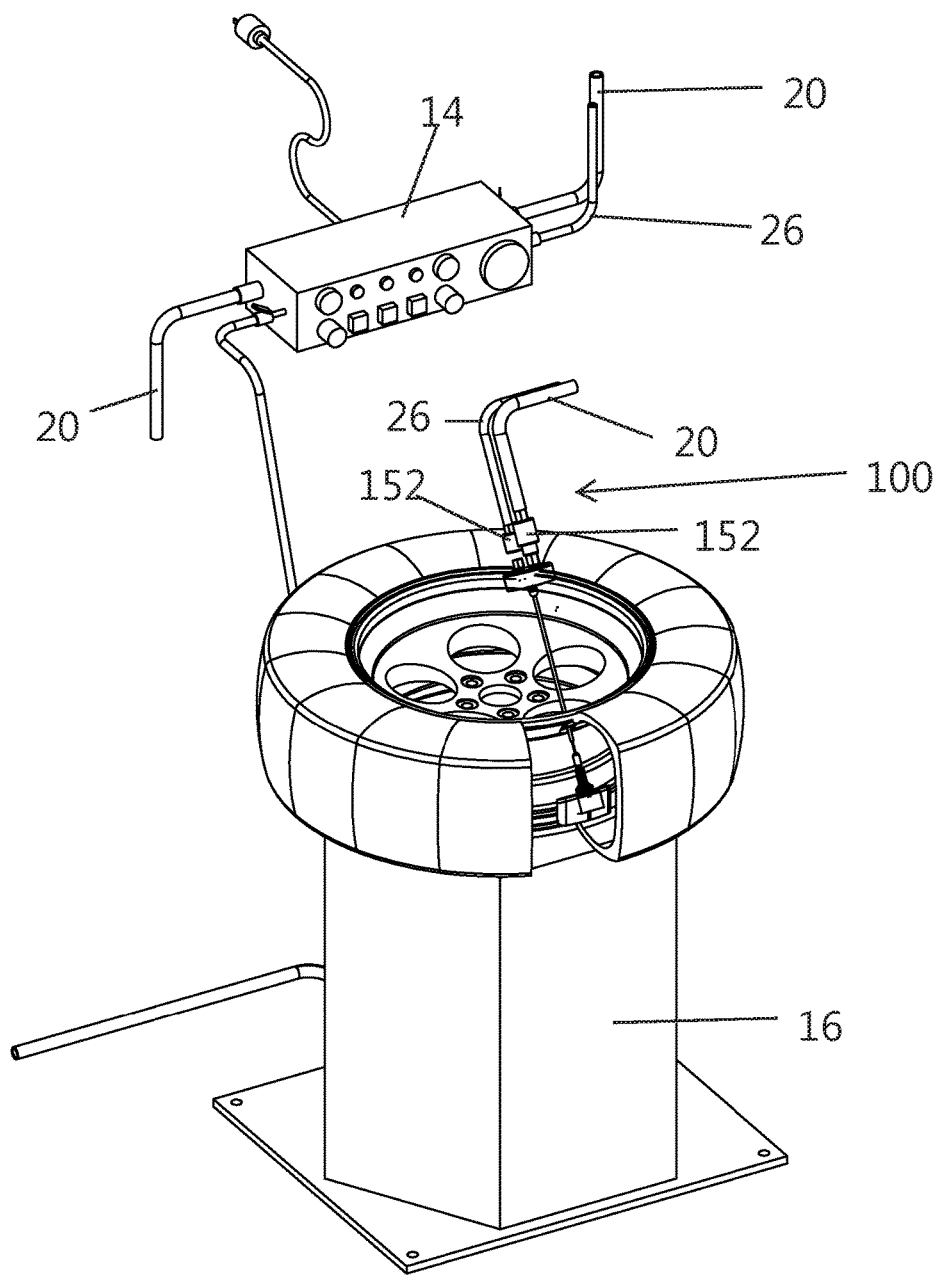
FIG. 6 is a partial sectional perspective view of an embodiment of a tire changing subsystem and high volume pressurized air nozzle apparatus of the present invention, showing a valve stem coupling coupled to a valve stem having a sensor attached to the stem.

An end of the valve stem includes threading on the outer surface of the valve stem. The adapter 124 or valve cap (not shown) may be screwed onto the threaded end of the valve stem. The outer diameter of the adapter 124 is sized slightly smaller than the aperture or hole 42 of the wheel rim so that the adapter may be pulled through the wheel rim hole. FIG. 3 illustrates an alternate preferred valve stem 40 of a known suitable type having a pliable rubber valve body that snaps in place and serves as a grommet of the valve stem. FIGS. 4 and 5 illustrate alternate preferred sensors 48 and 50 of known suitable construction that include additional sensing features other than pressure. By way of example, sensors 48 and 50 may transmit a signal corresponding to internal tire pressure, temperature, or angular momentum of the tire. FIG. 6 illustrates an embodiment of the tire inflation system 10 having individual quick connect hose fittings 152 to individually connect the air supply conduit 20 and feedback conduit 26 to the nozzle 100.

Figure 7:
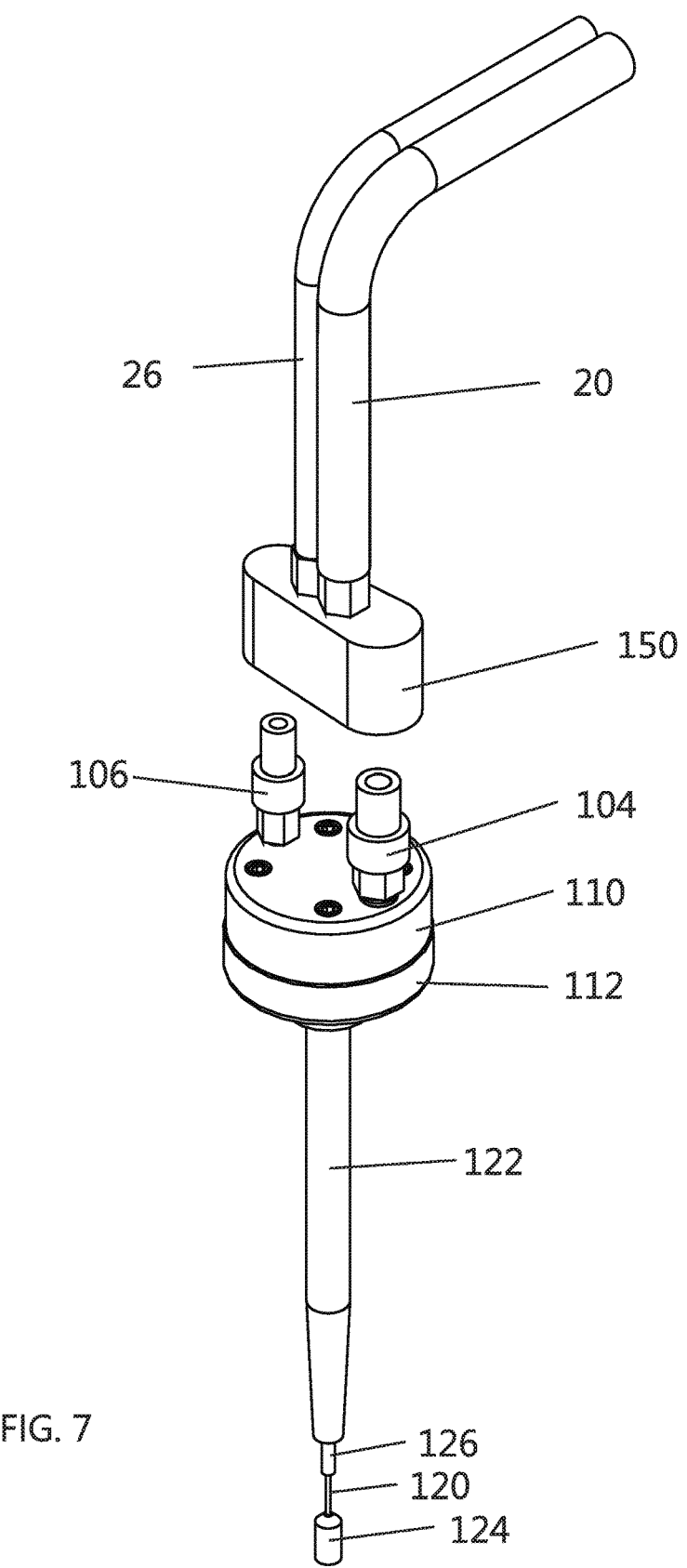
FIG. 7 is a partial sectional perspective view of an embodiment of a high volume pressurized air nozzle apparatus of the present invention.
Figure 8:
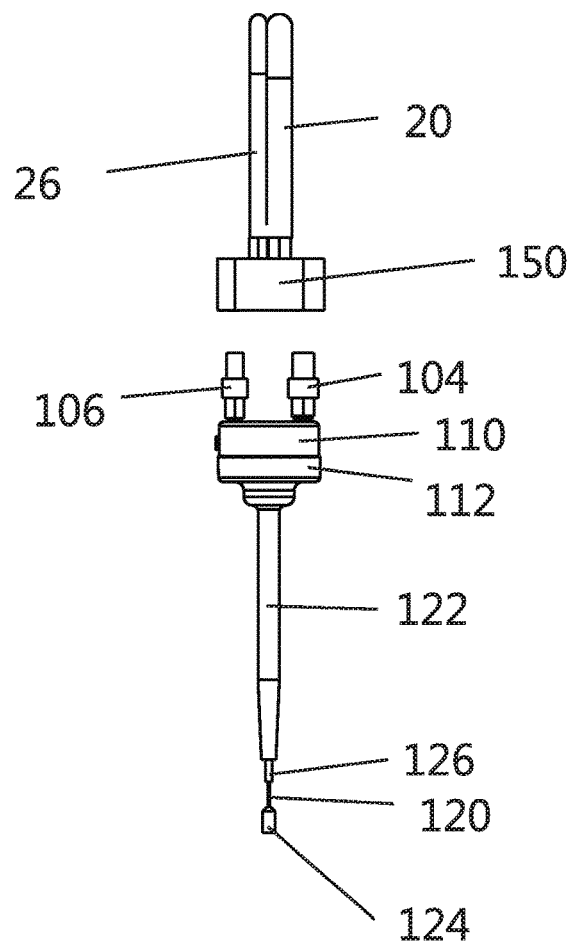
FIG. 8 is a partial sectional front elevational view of an embodiment of a high volume pressurized air nozzle apparatus of the present invention.
Figure 9:
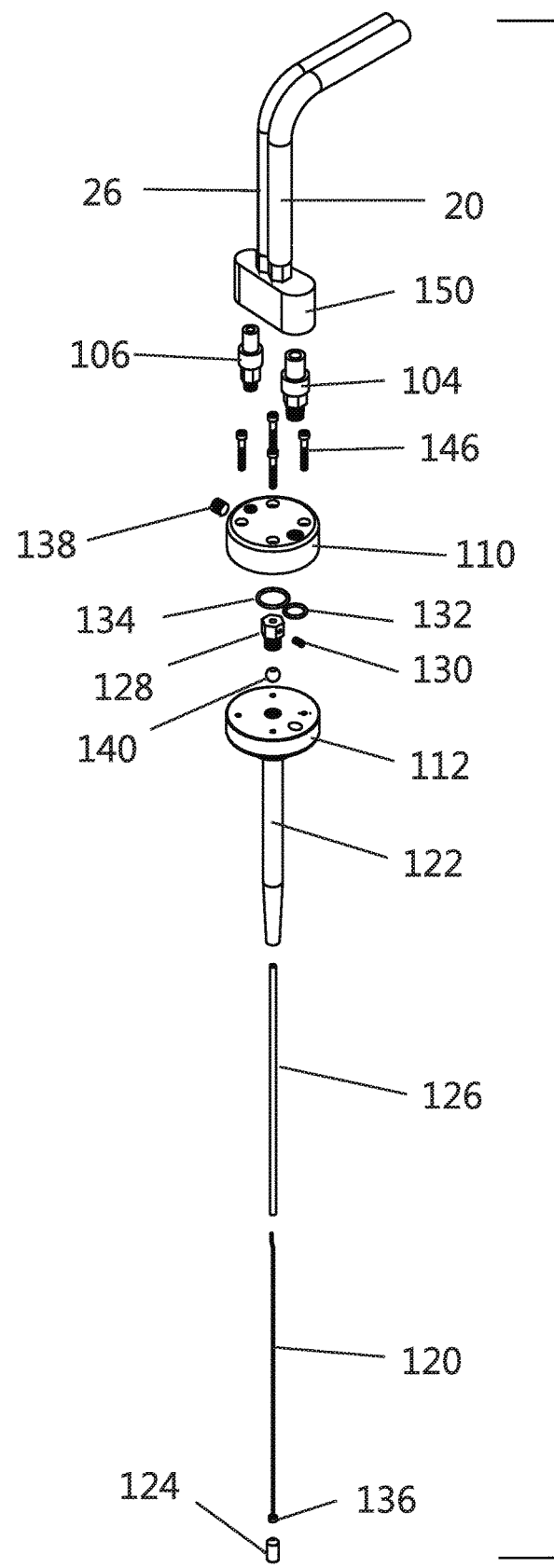
FIG. 9 is a partial sectional exploded perspective view of an embodiment of a high volume pressurized air nozzle apparatus of the present invention.

With reference to FIGS. 7-12 exemplary nozzles 100 of the present invention will be further described. FIGS. 7-9 illustrates the basic components of the nozzle 100. The nozzle 100 includes a separable upper main body 110 and lower main body 112. Quick connect air hose fittings 104 and 106 are engaged with the upper main body 110 and couple to a dual quick connect fitting 150. The dual quick connect is coupled in line to the air supply conduit 20 and feedback conduit 26. The lower main body 112 includes a high volume air delivery duct or conduit 122 extending from a bottom of the lower main body 112. A secondary feedback conduit 126 extends through the high volume conduit 122. An end of the feedback conduit 126 extends through an aperture of spherical seal 140 and is fixed to cable plug 128. Cable 120 extends through feedback conduit 126 and is fixed to the cable plug 128 by engaging set screw 130. Without limitation intended, cable 120 may be comprised of one or more wires, flexible rods, threads, ropes or other material of known suitable construction capable of connecting the adapter 124 to the main body and having a high enough tensile strength to allow a user to use it (the cable) to pull valve stem 40 through a valve stem hole 42. The set screw is accessed by removing set screw access plug 138 from the set screw passageway formed in the lower main body 112. Adapter 124 is joined to a free end of cable 120. A nub 136 on the free end of cable 120 restricts an end of the cable within the adapter 124. The upper and lower main bodies are fastened together with screws 146.

Figure 10:
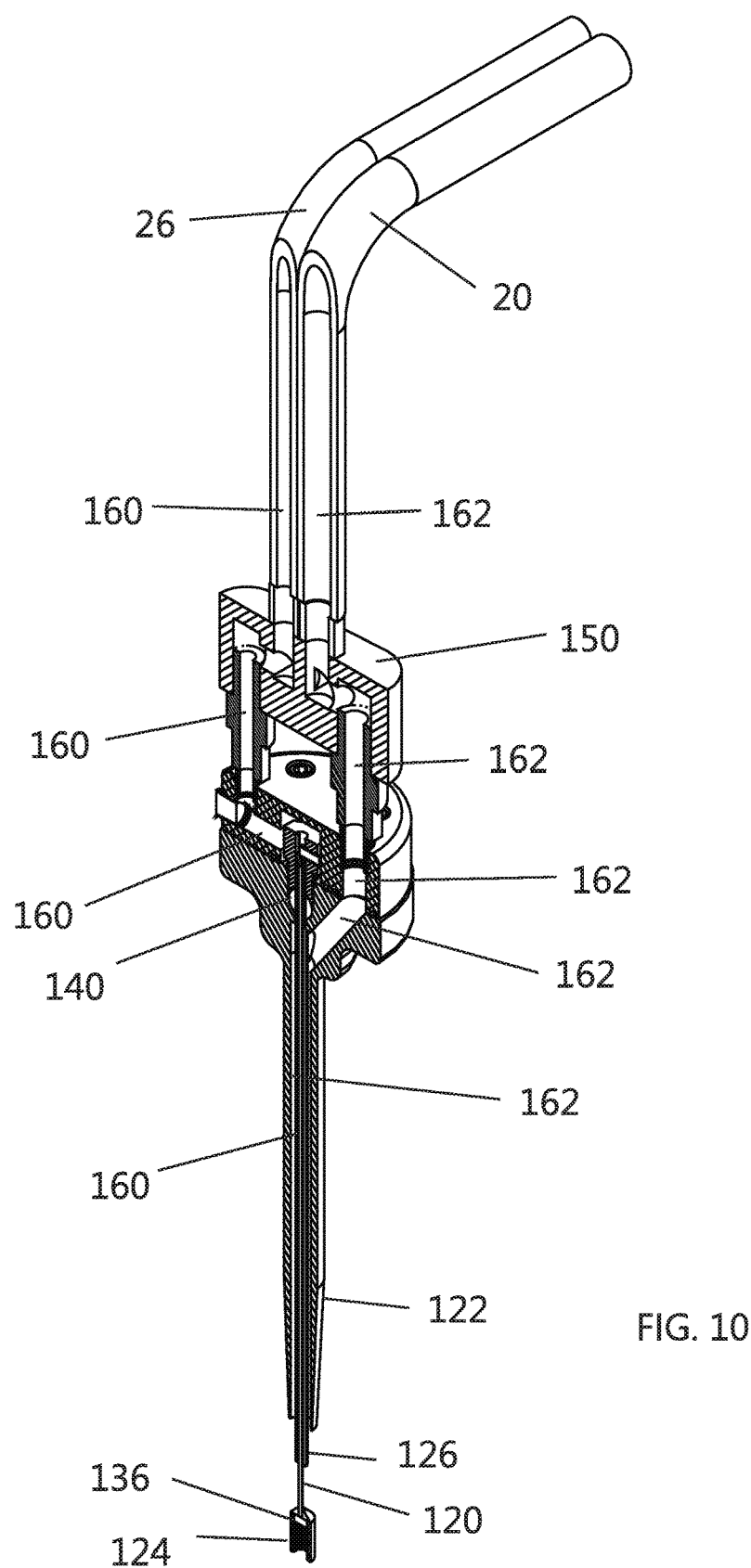
FIG. 10 is a partial sectional perspective view of an embodiment of a high volume pressurized air nozzle apparatus of the present invention.
Figure 11:
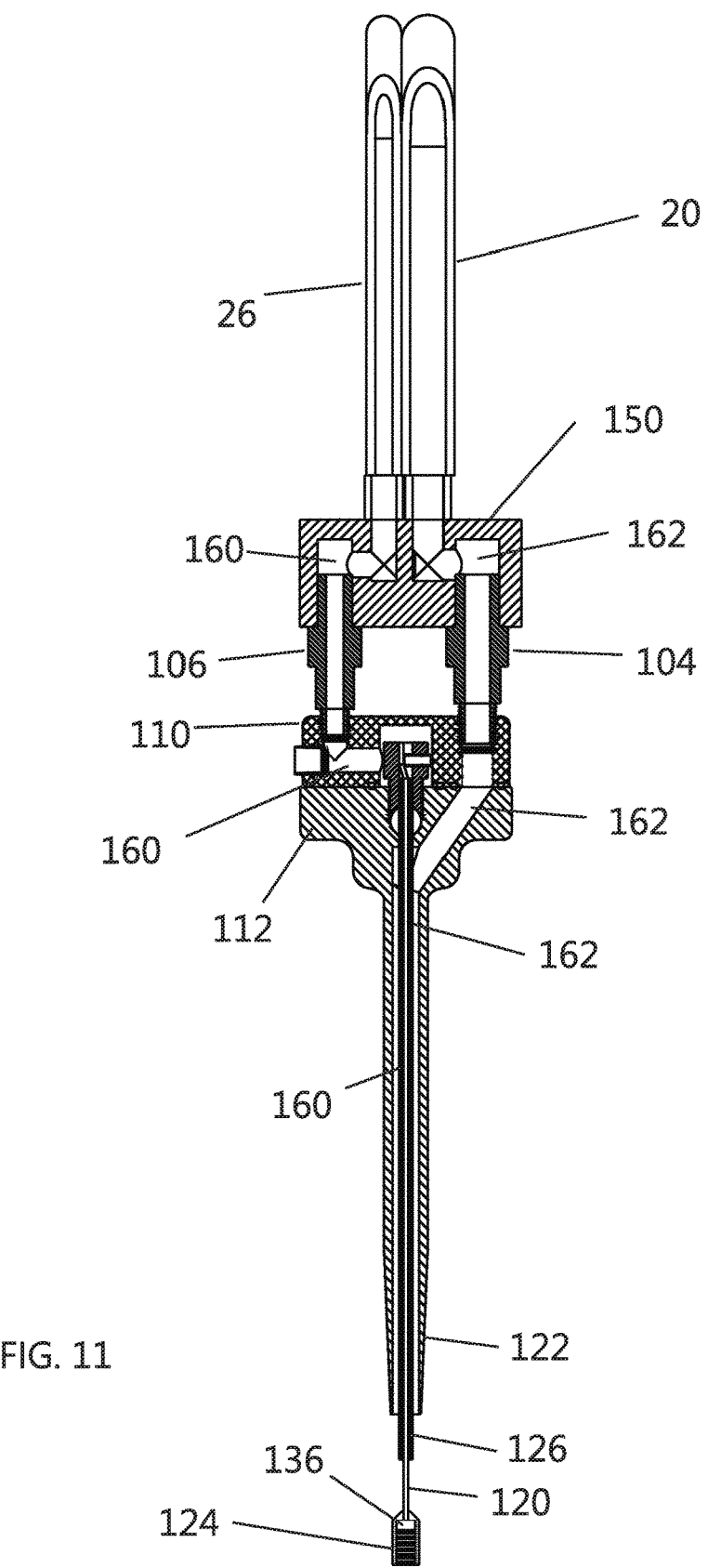
FIG. 11 is a partial sectional front elevational view of an embodiment of a high volume pressurized air nozzle apparatus of the present invention.
Figure 12:
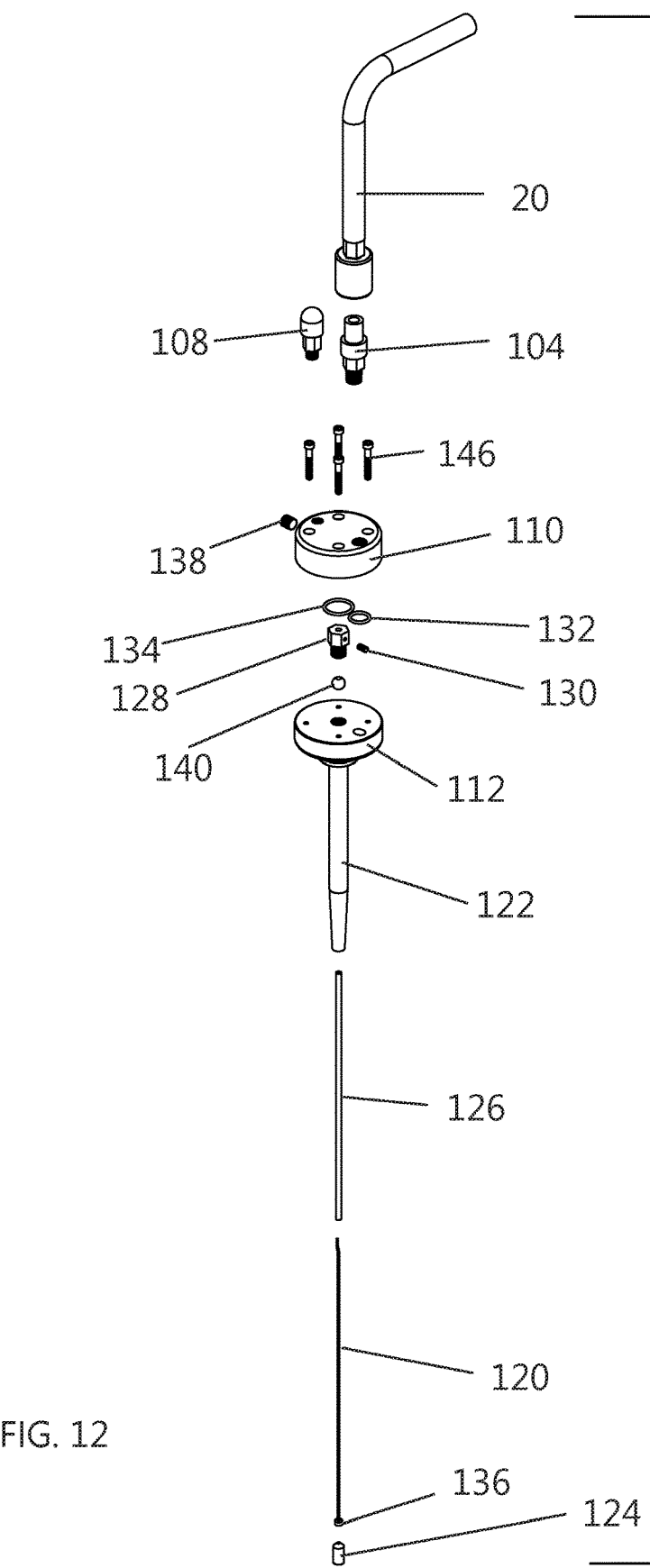
FIG. 12 is a partial sectional perspective view an embodiment of a high volume pressurized air nozzle apparatus of the present invention.

FIGS. 10 and 11 further illustrate the air passageways within the nozzle 100. Specifically, high volume air passage 162 is formed within and interconnects between dual quick connect 150, coupling 104, upper and lower main bodies 110 and 112, and delivery conduit 122. Similarly, separate feedback passageway 160 is formed within and interconnects between dual quick connect 150, coupling 106, upper and lower main bodies 110 and 112, and feedback conduit 126. Seals 132 and 134 are positioned surrounding the air passageways 160 and 162 between the upper and lower main bodies 110 and 112. FIG. 12 illustrates an alternate preferred nozzle 100 having a remote pressure feedback sensor 108 coupled in line to the pressure feedback conduit 126 of the nozzle 100.

Figure 13:
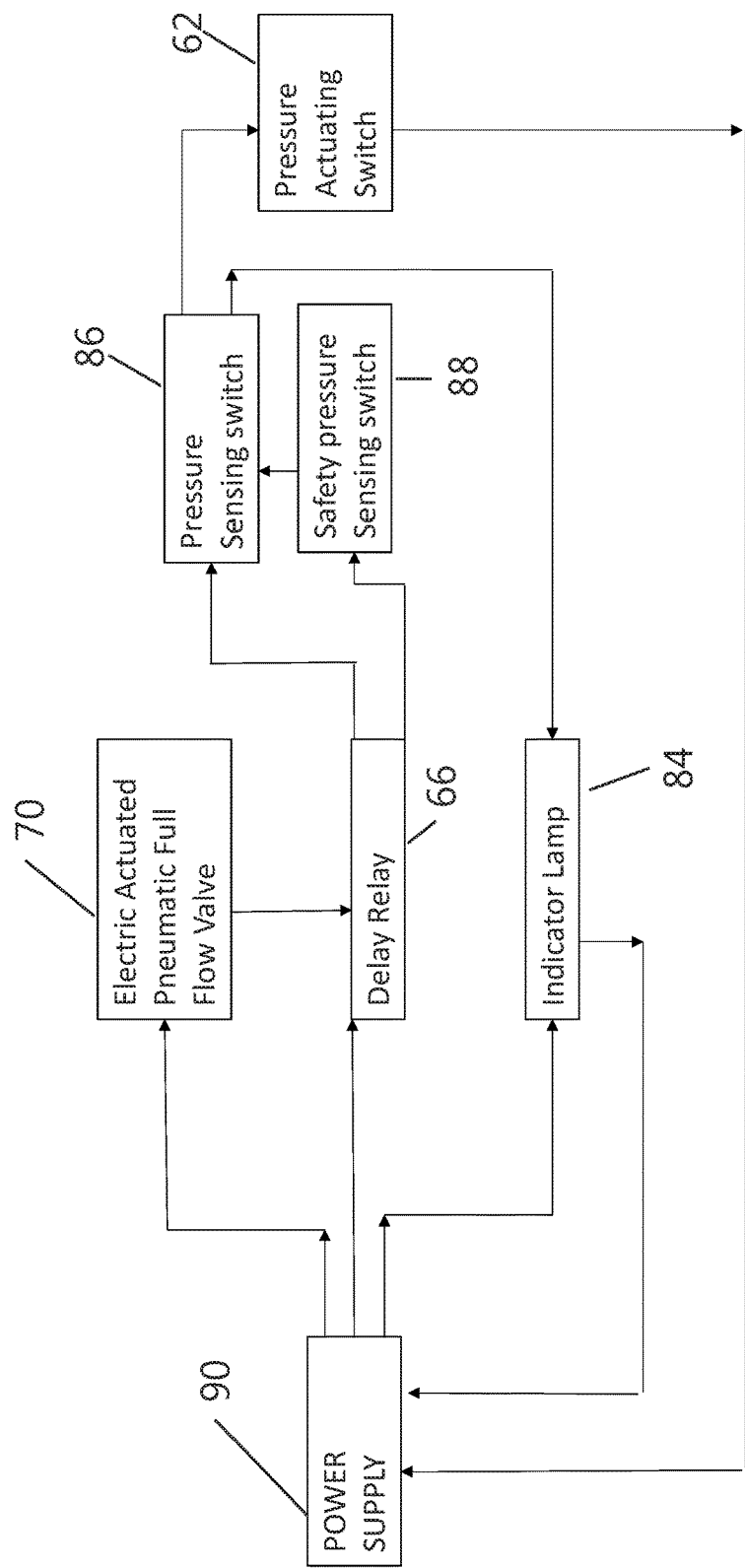
FIG. 13 is an electrical schematic of various components of an embodiment of a tire changing machine of the present invention.
Figure 14:
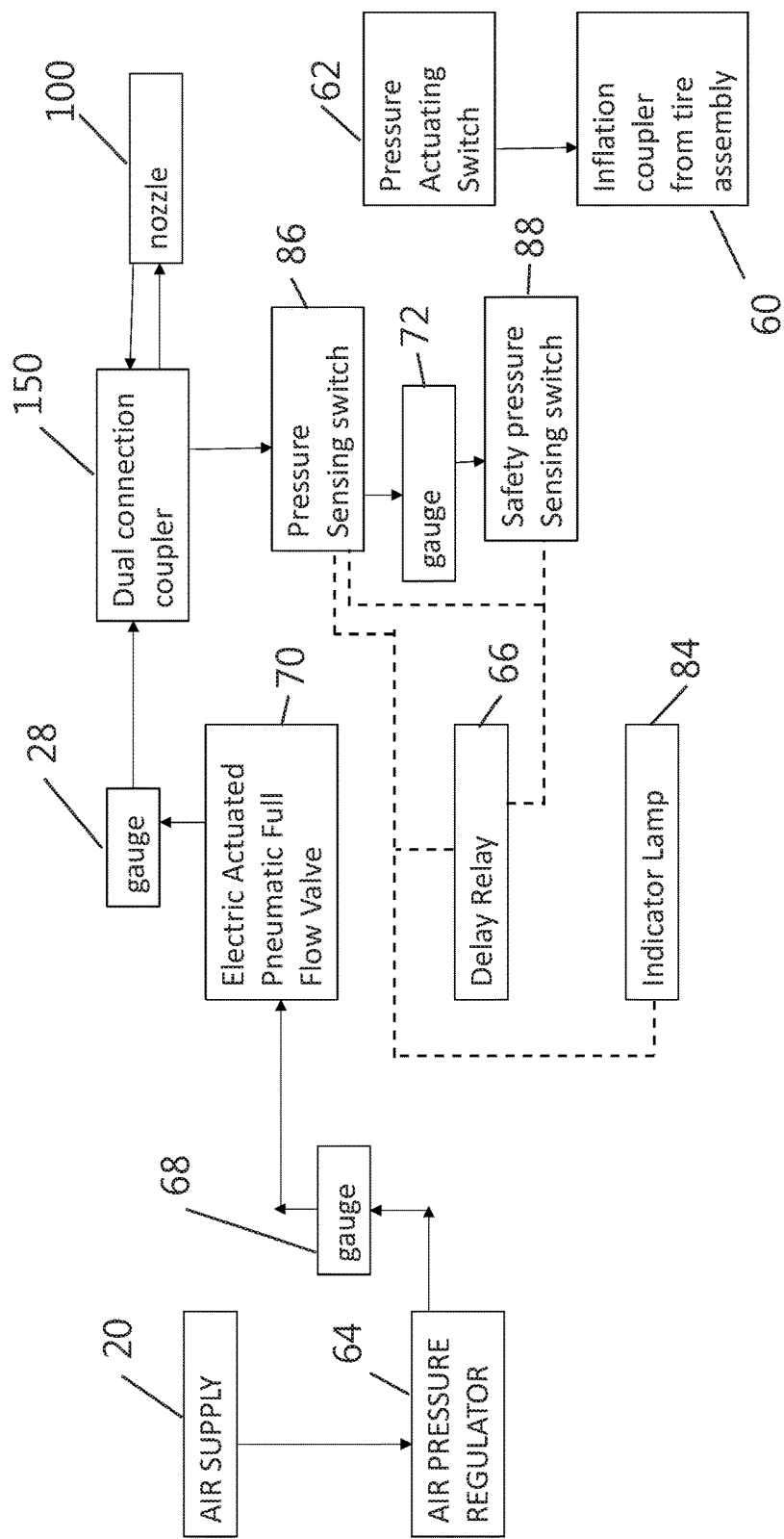
FIG. 14 is a pneumatic schematic of various components of an embodiment of a tire changing machine and high volume pressurized air nozzle apparatus of the present invention.

With reference to FIGS. 13 and 14, controlling the delivery of air to the tire will be described in greater detail. The controller 14 is electrically coupled to power supply 92 and generally includes the components to monitor and control the delivery of compressed air to the nozzle 100. The electric circuit within the controller includes an electric actuated pneumatic flow valve 70 coupled to electrical delay relay 66. Delay relay 66 is electrically coupled in line to pressure sensing switch 86 and safety switch 88. Pressure actuating switch 62 is also electrically coupled to the circuit and an activation indicator lamp is coupled to the pressure sensing switch 86. The pneumatic circuit is further illustrated in FIG. 14. Air is delivered from air supply 20 through an air pressure regulator 64. The pressure and rate of flow is controlled by adjusting the pressure regulator 64. Gauge 68 provides an indication of the air pressure exiting the pressure regulator 64. Air flows from the regulator 64 to electric actuated pneumatic flow valve 70. Opening and closing of the valve 70 is controlled by controller 14. A large dial gauge 28 allows the user to monitor the pressure of air being supplied to dual connection coupler 150 of the nozzle 100. Pressure sensing switch 86, gauge 72 and safety pressure sensing switch 88 are coupled in line and controller 14 further controls actuation of the flow valve 70 dependent upon the signals from the pressure sensing switches 86 and 88. Tire mount station 16 may further include an inflation coupler 60 and pressure actuating switch 62 pneumatically coupled to the controller 14.

Having described the constructional features of the tire inflating system 10 of the present invention, the mode of use will is now be described in greater detail. The user positions a selected tire 36 above rim 38 and uses tire mounting station 16 to rotate a tool about a first tire bead to stretch the tire bead over the wheel rim 38. The user then readjusts the tool and again rotates the tool to stretch the second tire bead over the wheel rim 38. Those skilled in the art will appreciate that other methods may be used to mount the tire on the rim so that both tire beads are positioned between the rims of the wheel rim. Once both tire beads are positioned between opposing rims or flanges of the wheel rim 38, a force is then applied to the tire, pressing down slightly on a sidewall of the tire to expose an interior of the tire between the tire and rim. A preselected valve is then positioned near rim hole 42 and the nozzle adapter 124 is extended through aperture or hole 42. Once through the hole the adapter is screwed onto or otherwise coupled to the valve end of the valve stem. A force is then applied to the tire to seat the first tire bead on the rim 38. Once the first bead is seated on the wheel rim, the opposing side or outer edge of the tire is lifted to thereby position the second seal near an opposing side of the wheel rim 38.

Once the opposing side of the tire is in a desired position, the end of the delivery conduit 122 of the nozzle 100 of the present invention is positioned within an opening of hole 42 of the wheel rim. The controller 14 is then utilized to open flow valve 70 and allow a high rate and high volume of air through the nozzle 100. The high rate and volume of air directed into the interior of the tire forces the tire sidewalls outward and seats both tire beads to the tire rim. The amount of time it takes for the sidewalls to extend outward and the beads to seal is typically less than 5 seconds. This time may be adjusted by varying the volume and rate of the air delivered to the interior of the tire. Once the beads snap into position on the wheel rim, the nozzle 100 is removed from the wheel rim in a manner so the adapter extends out the hole. A continued force is applied to the cable to pull a portion of the valve stem 40 through the hole 42 until the valve stem body 46 snaps into place and seals against the wheel rim 38. Once the tire is mounted to the rim and the valve sealed to the rim an air hose may be coupled to the valve to deliver compressed air through the valve stem until the internal tire pressure reaches a desired internal pressure.

The controls on controller 14 may be used to control the rate and volume of air is delivered to the interior of the tire. Also, the pressure within the tire is monitored and controlled so that when the tire beads seat against the wheel rim, the internal tire pressure does not exceed a desired pressure. A bypass or pressure override 30 on the controller 30 may be utilized to provide an additional desired volume of air. The bypass 30 may be utilized, for example, when the internal tire volume is large or the tire bead is difficult to seat. Even when using the bypass 30 the safety pressure sending switch 88 avoids seating the bead and inflating the tire with an internal pressure that exceeds a preset amount.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A compressed air delivery apparatus of a tire mounting and inflation system, said air delivery apparatus comprising:
   a nozzle having a main body and an air delivery conduit extending from main body, said main body adapted to couple to a pressurized air supply conduit;
   a cable having a threaded adapter attached to a first end of said cable and wherein a portion of said cable extends through at least a portion of said air delivery conduit and wherein a portion of said cable extends out an open end of said air delivery conduit of said nozzle, and wherein said threaded adapter is adaptable to couple to a tire valve stem.

2. The air delivery apparatus as recited in claim 1, wherein said main body of said nozzle includes a first coupling to couple to a high volume pressurized air stream delivery hose.

3. The air delivery apparatus as recited in claim 2, wherein said main body of said nozzle further includes a second coupling to couple to an air return conduit.

4. The air delivery apparatus as recited in claim 1, wherein said main body includes a first passageway in fluid communication with a high volume pressurized air supply and a second air passageway in fluid communication with an air return conduit.

5. The air delivery apparatus as recited in claim 3, further including a pressure feedback conduit coupled to the main body and coupled in fluid communication with the air return conduit.

6. The air delivery apparatus as recited in claim 4, further including a pressure feedback sensing switch coupled in fluid communication to said air return conduit.

7. The air delivery apparatus as recited in claim 1, further including a pneumatic high volume air supply coupled to said pressurized air supply conduit and further including flow valve coupled to said nozzle.

8. The air delivery apparatus as recited in claim 1, wherein a second end of the cable is fixed within the main body of the nozzle.

9. A tire inflation air pressure hose nozzle apparatus, said apparatus comprising:
   an air delivery nozzle having a main body and an air delivery conduit extending from main body, said main body adapted to couple to a pressurized air supply; said nozzle including a cable having a threaded adapter attached to a first end of said cable and wherein a portion of said cable extends through at least a portion of said air delivery conduit and wherein said threaded adapter is adaptable to couple to a tire valve stem.

10. The apparatus as recited in claim 9 further including a pressure regulator coupled to said pressurized air supply.

11. The apparatus as recited in claim 9, further including a pressure feedback passageway.

12. The apparatus as recited in claim 11, further including an air return conduit coupled to said air delivery nozzle.

13. The apparatus as recited in claim 12, further including a pressure feedback sensing switch coupled in fluid communication with said air return conduit.

14. The air delivery apparatus as recited in claim 11, wherein a feedback sensor is coupled to the pressure feedback passageway.

15. The apparatus as recited in claim 9 further including a pressure feedback sensing switch coupled in fluid communication with said pressurized air supply.

16. The apparatus as recited in claim 9, wherein a portion of said cable extends out an open end of said air delivery conduit.

17. The air delivery apparatus as recited in claim 9, wherein a second end of the cable is fixed to a cable plug positioned within the main body of the nozzle.

18. A method of mounting and rapidly inflating a tire on a wheel rim, said method including the steps of:
- positioning a tire on a wheel rim, wherein inner and outer tire beads of said tire are positioned between respective inner and outer flanges of said wheel rim;
- positioning a valve stem within an interior of said tire adjacent an aperture formed in said wheel rim;
- providing a nozzle having a main body and an air delivery conduit extending from main body, said main body adapted to couple to a pressurized air supply conduit;
- providing a cable having a threaded adapter attached to a first end of said cable and wherein a portion of said cable extends through at least a portion of said air delivery conduit of said nozzle and wherein said threaded adapter is adaptable to couple to the valve stem;
- extending the adapter through the aperture formed in the wheel rim and coupling the adapter to the valve stem within the interior of the tire; and
- delivering a high volume of fluid from said air delivery conduit of said nozzle into the interior of the tire through the aperture formed in said wheel rim.

19. The method as recited in claim 18 further including the step of sealing said inner and outer tire beads against wheel rim.

20. The method as recited in claim 19 further including the step of applying a force to said cable to move said valve stem through said aperture formed in said wheel rim.

* * * * *